United States Patent
McGuigan et al.

(10) Patent No.: US 9,920,840 B2
(45) Date of Patent: Mar. 20, 2018

(54) VALVE WITH DIFFERENT THREADS FOR PREVENTING ROTATION OF AND LOCKING BONNET WITHIN VALVE

(71) Applicant: Clark-Reliance Corporation, Strongsville, OH (US)

(72) Inventors: Steven Robert McGuigan, Richfield, OH (US); Robert Martin Wilber, Jr., Fairview Park, OH (US)

(73) Assignee: Clark-Reliance Corporation, Strongsville, OH (US)

( * ) Notice: Subject to any disclaimer, the term of this patent is extended or adjusted under 35 U.S.C. 154(b) by 0 days.

(21) Appl. No.: 14/821,204

(22) Filed: Aug. 7, 2015

(65) Prior Publication Data
US 2016/0040787 A1 Feb. 11, 2016

Related U.S. Application Data

(60) Provisional application No. 62/035,159, filed on Aug. 8, 2014.

(51) Int. Cl.
| | |
|---|---|
| *F16K 1/02* | (2006.01) |
| *F16K 41/04* | (2006.01) |
| *F16K 1/32* | (2006.01) |
| *F16K 27/02* | (2006.01) |
| *F16K 27/08* | (2006.01) |
| *F16K 1/14* | (2006.01) |

(Continued)

(52) U.S. Cl.
CPC ............. *F16K 1/02* (2013.01); *F16K 1/32* (2013.01); *F16K 27/02* (2013.01); *F16K 27/0245* (2013.01); *F16K 27/08* (2013.01); *F16K 31/506* (2013.01); *F16K 1/14* (2013.01); *F16K 31/50* (2013.01); *F16K 41/04* (2013.01); *F16K 41/06* (2013.01)

(58) Field of Classification Search
CPC ..... F16K 1/02; F16K 1/14; F16K 1/32; F16K 27/02; F16K 27/0245; F16K 31/50; F16K 31/506; F16K 1/04; F16K 27/08; F16K 41/04; F16K 41/06; Y10T 137/6065; Y10T 137/6069
USPC ................ 251/265; 137/315.27, 315.28
See application file for complete search history.

(56) References Cited

U.S. PATENT DOCUMENTS

| | | | |
|---|---|---|---|
| 368,073 A | 8/1887 | Convert | |
| 928,751 A * | 7/1909 | Harcourt | F16K 27/02 251/223 |
| 941,934 A | 11/1909 | Marsh | |

(Continued)

FOREIGN PATENT DOCUMENTS

DE 102009057611 A1 * 6/2011 ............. F16K 27/02

OTHER PUBLICATIONS

"Left-hand Thread." Dictionary of Automotive Terms. Excerpt. <http://www.motorera.com/dictionary/le.htm> Oct. 12, 2007, retrieved from Internet Archive Wayback Machine <https://web.archive.org/web/20071012132951/http://motorera.com/dictionary/LE.HTM> on Nov. 28, 2016.*

(Continued)

*Primary Examiner* — Mary McManmon
*Assistant Examiner* — Richard K Durden
(74) *Attorney, Agent, or Firm* — Calfee, Halter & Griswold LLP

(57) ABSTRACT

The present invention provides a valve with different threads for preventing rotation of and locking a bonnet with the valve.

20 Claims, 14 Drawing Sheets

(51) Int. Cl.
*F16K 41/06* (2006.01)
*F16K 31/50* (2006.01)

(56) References Cited

U.S. PATENT DOCUMENTS

| | | | |
|---|---|---|---|
| 974,498 A | 11/1910 | Kerbaugh | |
| 1,588,128 A | 6/1926 | Montgomery | |
| 2,018,455 A | 10/1935 | Lofton | |
| 2,177,888 A | 10/1939 | Huff | |
| 2,982,512 A | 5/1961 | Hurley | |
| 3,002,775 A | 10/1961 | Mueller et al. | |
| 3,058,484 A | 10/1962 | Feiring | |
| 3,334,654 A | 8/1967 | Donner | |
| 3,529,805 A | 9/1970 | Callahan, Jr. et al. | |
| 3,633,873 A | 1/1972 | Leopold, Jr. et al. | |
| 3,976,279 A | 8/1976 | Walker | |
| 4,114,851 A | 9/1978 | Shivak et al. | |
| 4,266,813 A | 5/1981 | Oliver | |
| 4,272,055 A | 6/1981 | Herd | |
| 4,630,629 A | 12/1986 | Nimberger | |
| 4,750,709 A | 6/1988 | Kolenc et al. | |
| 4,809,440 A | 3/1989 | Rutter | |
| 4,844,411 A | 7/1989 | Nelson | |
| 4,860,784 A | 8/1989 | Petersen et al. | |
| 4,986,300 A | 1/1991 | Bremers et al. | |
| H945 H | 8/1991 | Taliaferro et al. | |
| 5,106,055 A * | 4/1992 | Phillips | F16K 31/50 137/614.2 |
| 5,195,785 A | 3/1993 | Jellison | |
| 5,255,704 A * | 10/1993 | Bennett | F16K 27/02 137/454.5 |
| 5,439,197 A | 8/1995 | Itoi et al. | |
| 6,102,367 A | 8/2000 | Schmitz et al. | |
| 6,148,841 A | 11/2000 | Davidson | |
| 6,991,216 B1 * | 1/2006 | Wilson | F16K 41/02 251/214 |
| 7,578,496 B2 | 8/2009 | Heelan, Jr. et al. | |
| 7,610,806 B2 | 11/2009 | Skinner | |
| 8,146,885 B2 | 4/2012 | Lin et al. | |
| 2007/0018132 A1 | 1/2007 | Gethmann et al. | |
| 2011/0068288 A1 | 3/2011 | Nimberger | |
| 2014/0103240 A1 * | 4/2014 | Glime, III | F16K 31/506 251/265 |

OTHER PUBLICATIONS

International Search Report for International App. No. PCT/US2015/044272 dated Nov. 6, 2015 (2 pages).

Written Opinion of the International Searching Authority for International App. No. PCT/US2015/044272 dated Nov. 6, 2015 (4 pages).

Gage Cocks for Reflex or Transparent Flat Glass Gages No. 60, Clark-Reliance Corporation, publicly available on Jan. 1, 1999 (2 pages).

\* cited by examiner

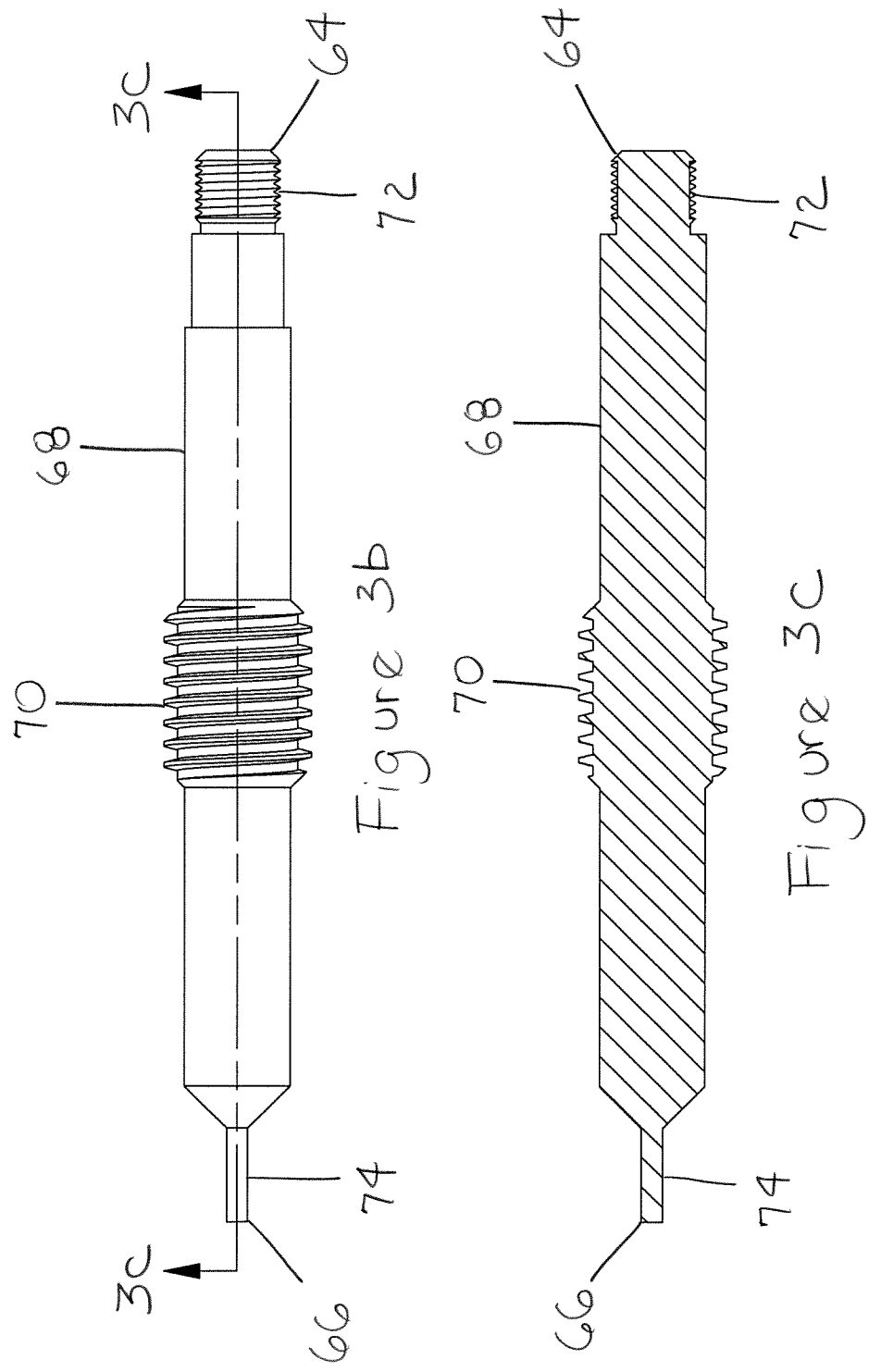

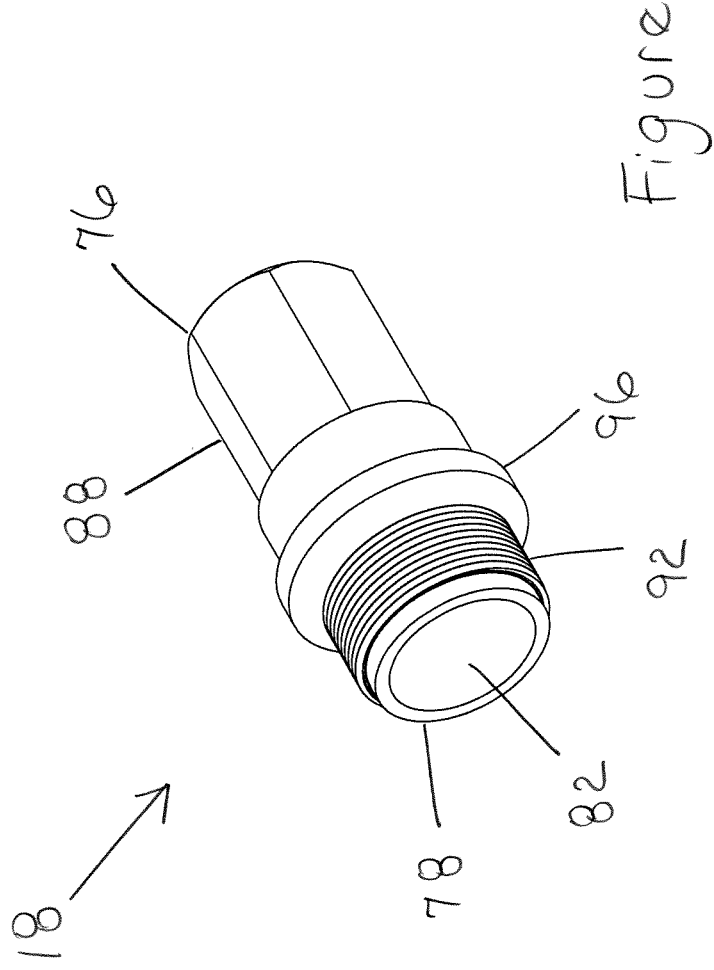

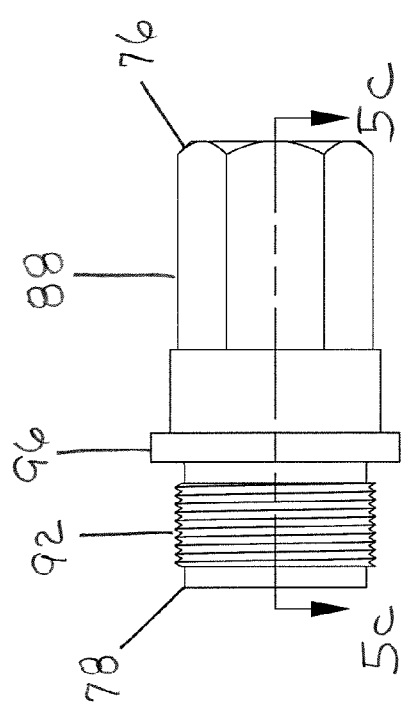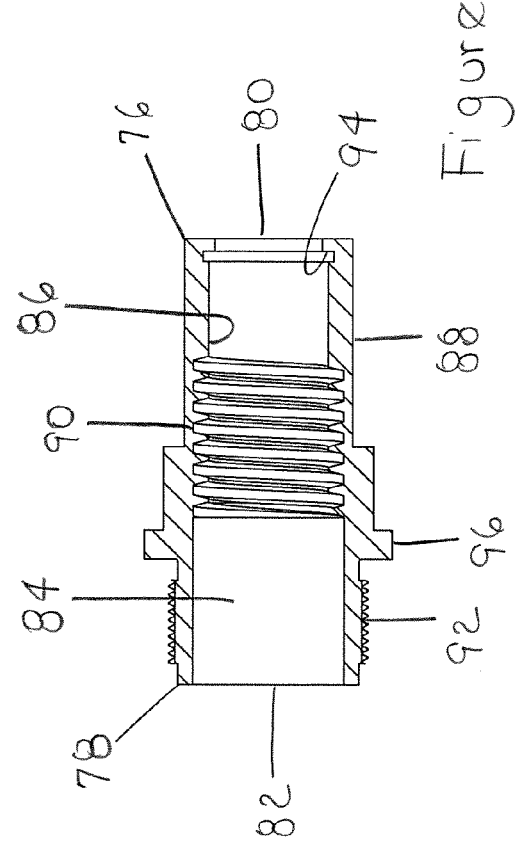

VALVE WITH DIFFERENT THREADS FOR PREVENTING ROTATION OF AND LOCKING BONNET WITHIN VALVE

CROSS-REFERENCE TO RELATED APPLICATION

This application claims the benefit of U.S. Provisional Application No. 62/035,159, filed Aug. 8, 2014, the entire disclosure of which is hereby incorporated by reference.

FIELD

The present invention relates generally to a valve, and, more particularly, to a valve with different threads for preventing rotation of and locking a bonnet with the valve.

BACKGROUND

Valves are known. Known valves include a stem threaded into a bonnet and the bonnet inserted into a body. Known valves also include packing external to the threads of the stem and a packing nut threaded onto the bonnet. The packing nut compresses the packing and creates a seal. Known valves further include a bonnet nut threaded onto the body. The bonnet nut retains the bonnet within the body. Difficulties can arise in preventing rotation of and locking the bonnet within the body when the bonnet is threaded into the body and/or when a sealing member is internal to the threads of the stem.

SUMMARY

The present invention provides a valve with different threads for preventing rotation of and locking a bonnet with the valve.

In an exemplary embodiment, the valve includes a body, a stem, a sealing member, a bonnet, and a locking nut. The body includes a first end and a second end. The first end includes an opening. The second end includes an opening. The body includes a longitudinal bore extending between the opening in the first end and the opening in the second end. The body has an inner surface and an outer surface. At least a portion of the inner surface of the body at the first end includes threads having a first thread pitch and a first thread direction. At least a portion of the outer surface of the body at the first end includes threads having a second thread pitch and a second thread direction. The stem has a first end and a second end. The stem has an outer surface. At least a portion of the outer surface of the stem includes threads having a third thread pitch and a third thread direction. The bonnet includes a first end and a second end. The first end includes an opening. The second end includes an opening. The bonnet includes a longitudinal bore extending between the opening in the first end and the opening in the second end. The bonnet has an inner surface and an outer surface. At least a portion of the inner surface of the bonnet includes threads having the third thread pitch and the third thread direction. At least a portion of the outer surface of the bonnet at the second end includes threads having the first thread pitch and the first thread direction. The locking nut includes a first end and a second end. The first end includes an opening. The second end includes an opening. The locking nut has an inner surface and an outer surface. At least a portion of the inner surface of the locking nut includes threads having the second thread pitch and the second thread direction. The first thread pitch is different than the second thread pitch, and/or the first thread direction is different than the second thread direction. The longitudinal bore in the body is operable to receive at least a portion of the stem. The second end of the bonnet is operable to be threaded into the first end of the body. The sealing member is operable to form a seal between the stem and the body when the stem is inserted into the longitudinal bore in the body and the second end of the bonnet is threaded into the first end of the body. The locking nut is operable to be threaded onto the outer surface of the first end of the body. Rotation of the stem within the bonnet does not cause rotation of the bonnet within the body.

In an exemplary embodiment, the valve includes a body, a stem, a sealing member, a bonnet, and a locking nut. The body includes a first end and a second end. The first end includes an opening. The second end includes an opening. The body includes a longitudinal bore extending between the opening in the first end and the opening in the second end. The body has an inner surface and an outer surface. At least a portion of the inner surface of the body at the first end includes threads having a first thread pitch and a first thread direction. At least a portion of the outer surface of the body at the first end includes threads having a second thread pitch and a second thread direction. The stem has a first end and a second end. The stem has an outer surface. At least a portion of the outer surface of the stem includes threads having a third thread pitch and a third thread direction. The bonnet includes a first end and a second end. The first end includes an opening. The second end includes an opening. The bonnet includes a longitudinal bore extending between the opening in the first end and the opening in the second end. The bonnet has an inner surface and an outer surface. At least a portion of the inner surface of the bonnet includes threads having the third thread pitch and the third thread direction. At least a portion of the outer surface of the bonnet at the second end includes threads having the first thread pitch and the first thread direction. The locking nut includes a first end and a second end. The first end includes an opening. The second end includes an opening. The locking nut has an inner surface and an outer surface. At least a portion of the inner surface of the locking nut includes threads having the second thread pitch and the second thread direction. The first thread pitch is different than the second thread pitch, and/or the first thread direction is different than the second thread direction. The longitudinal bore in the body is operable to receive at least a portion of the stem. The second end of the bonnet is operable to be threaded into the first end of the body. The sealing member is operable to form a seal between the stem and the body internal to the threads on the stem and the bonnet when the stem is inserted into the longitudinal bore in the body and the second end of the bonnet is threaded into the first end of the body. The locking nut is operable to be threaded onto the outer surface of the first end of the body. Rotation of the stem within the bonnet does not cause rotation of the bonnet within the body.

In an exemplary embodiment, the valve includes a body, a stem, a sealing member, a bonnet, and a locking nut. The body includes a first end and a second end. The first end includes an opening. The second end includes an opening. The body includes a longitudinal bore extending between the opening in the first end and the opening in the second end. The body has an inner surface and an outer surface. At least a portion of the inner surface of the body at the first end includes threads having a first thread pitch and a first thread direction. At least a portion of the outer surface of the body at the first end includes threads having a second thread pitch and a second thread direction. The stem has a first end and a second end. The stem has an outer surface. At least a portion of the outer surface of the stem includes threads having a third thread pitch and a third thread direction. The bonnet includes a first end and a second end. The first end includes an opening. The second end includes an opening. The bonnet includes a longitudinal bore extending between the opening in the first end and the opening in the second end. The bonnet has an inner surface and an outer surface. At least a portion of the inner surface of the bonnet includes threads having the third thread pitch and the third thread direction. At least a portion of the outer surface of the bonnet at the second end includes threads having the first thread pitch and the first thread direction. The bonnet includes a flange extending from the outer surface thereof. The locking nut includes a first end and a second end. The first end includes an opening. The second end includes an opening. The locking nut has an inner surface and an outer surface. At least a portion of the inner surface of the locking nut includes threads having the second thread pitch and the second thread direction. The locking nut includes a flange extending from the inner surface thereof at the first end. The first thread pitch is different than the second thread pitch, and/or the first thread direction is different than the second thread direction. The longitudinal bore in the body is operable to receive at least a portion of the stem. The second end of the bonnet is operable to be threaded into the first end of the body. The sealing member is operable to form a seal between the stem and the body when the stem is inserted into the longitudinal bore in the body and the second end of the bonnet is threaded into the first end of the body. The locking nut is operable to be threaded onto the outer surface of the first end of the body. The flange extending from the inner surface of the locking nut is operable to interface with the flange extending from the outer surface of the bonnet to prevent the bonnet from being threaded out of the first end of the body. Rotation of the stem within the bonnet does not cause rotation of the bonnet within the body.

BRIEF DESCRIPTION OF THE DRAWINGS

—FIG. 1a is a perspective view, FIGS. 1b is a top plan view, and FIG. 1c is a cross-sectional view taken along the line 1c-1c in FIG. 1b;

—FIG. 2a is a perspective view, FIG. 2b is a rear elevational view, FIG. 2c is a cross-sectional view taken along the line 2c-2c in FIG. 2b, FIG. 2d is a top plan view, and FIG. 2e is a cross-sectional view taken along the line 2e-2e in FIG. 2d;

FIGS. 3a-3c are views of a stem for use in the valve of FIG. 1 according to an exemplary embodiment of the present invention—FIG. 3a is a perspective view, FIG. 3b is a top plan view, and FIG. 3c is a cross-sectional view taken along the line 3c-3c in FIG. 3b;

—FIG. 4a is a perspective view, FIG. 4b is a top plan view, and FIG. 4c is a right side elevational view;

FIGS. 5a-5c are views of a bonnet for use in the valve of FIG. 1 according to an exemplary embodiment of the present invention—FIG. 5a is a perspective view, FIG. 5b is a top plan view, and FIG. 5c is a cross-sectional view taken along the line 5c-5c in FIG. 5b;

—FIG. 6a is a perspective view, FIG. 6b is a top plan view, FIG. 6c is a right side elevational view, and FIG. 6d is a cross-sectional view taken along the line 6d-6d in FIG. 6c; —FIG. 7a is a top plan view and FIG. 7b is a cross-sectional view taken along the line 7b-7b in FIG. 7a.

DETAILED DESCRIPTION

Figure 1A:
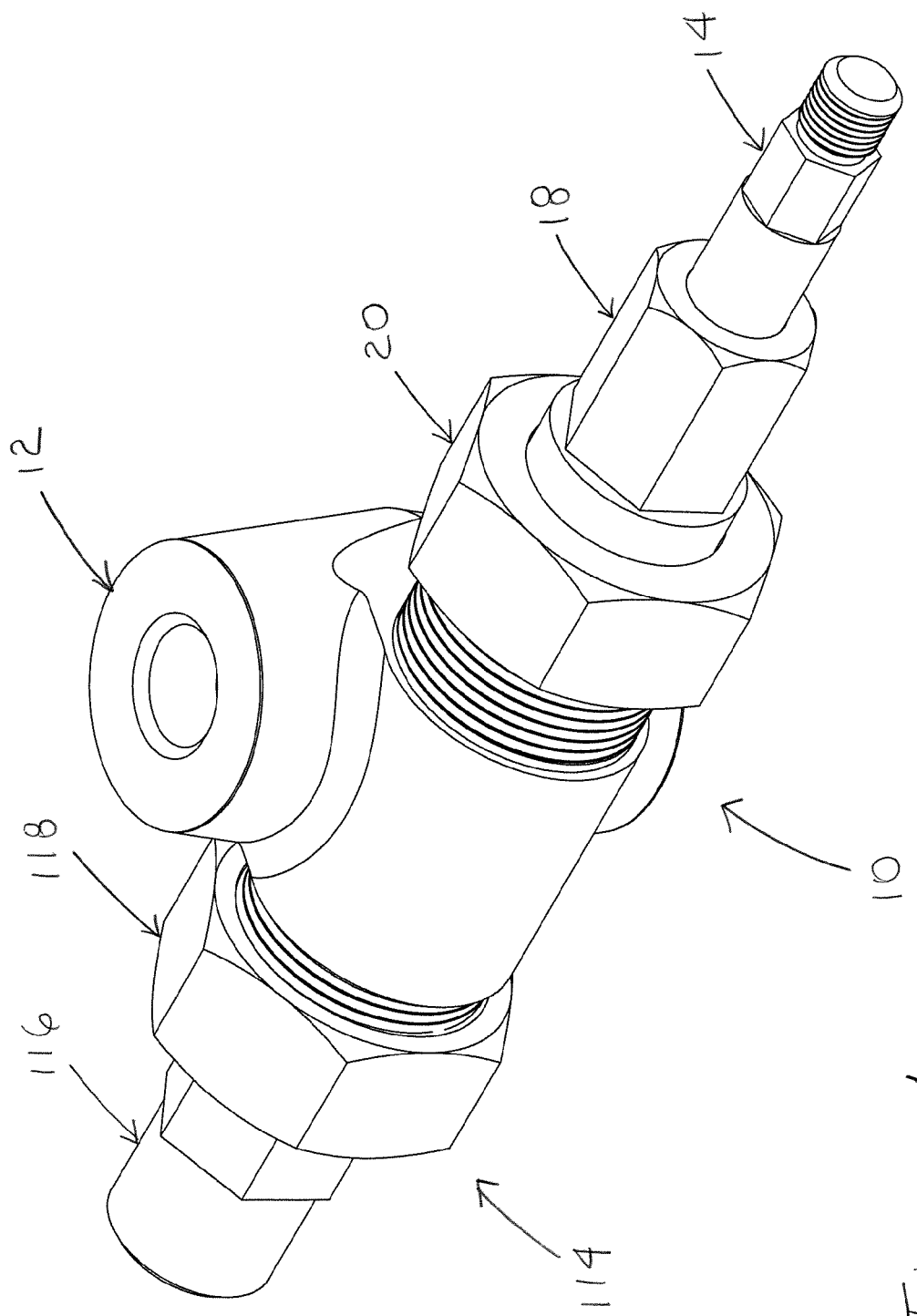
FIGS. 1a-1c are views of a valve according to an exemplary embodiment of the present invention
Figure 1B:
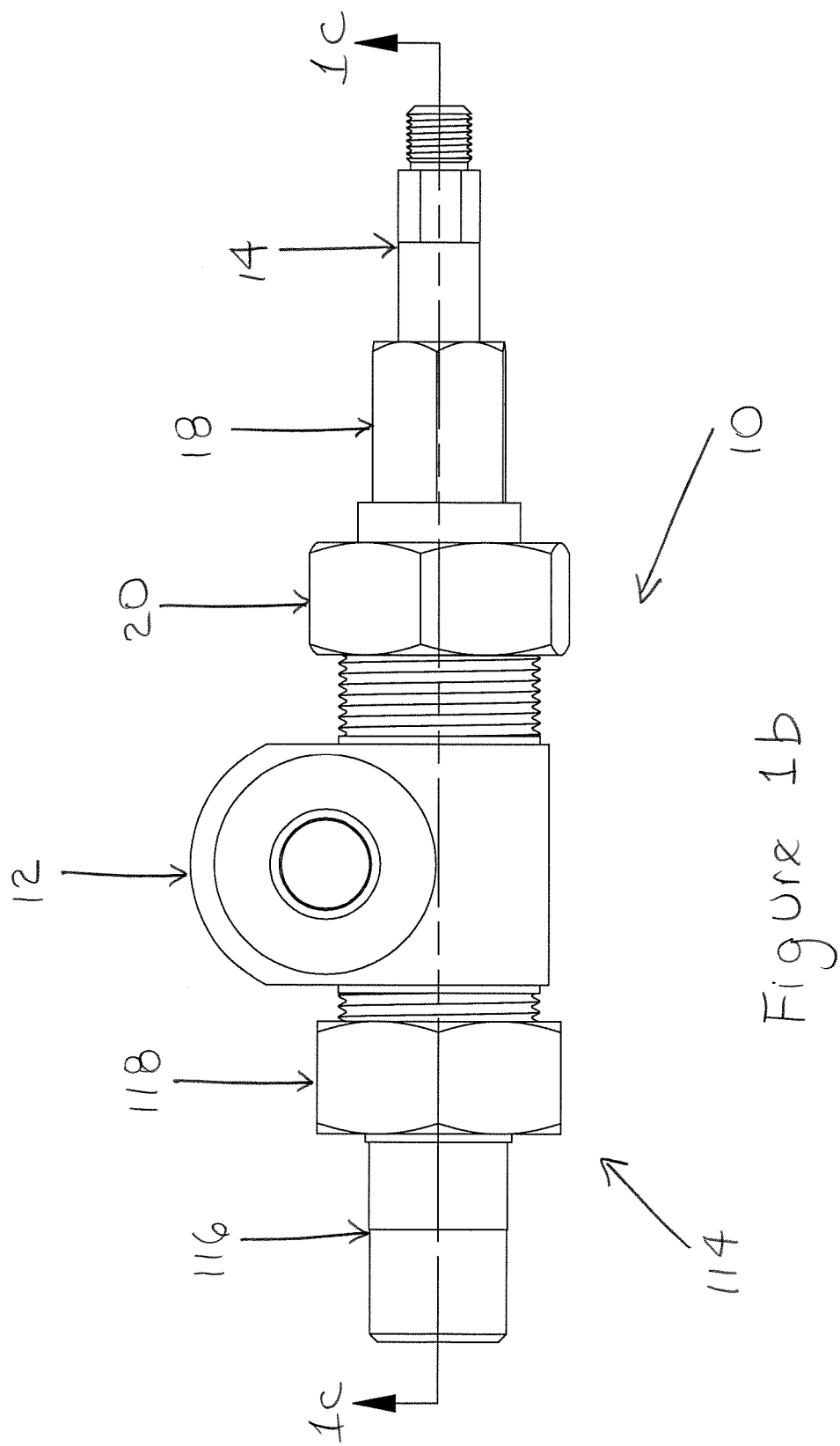
Figure 1C:
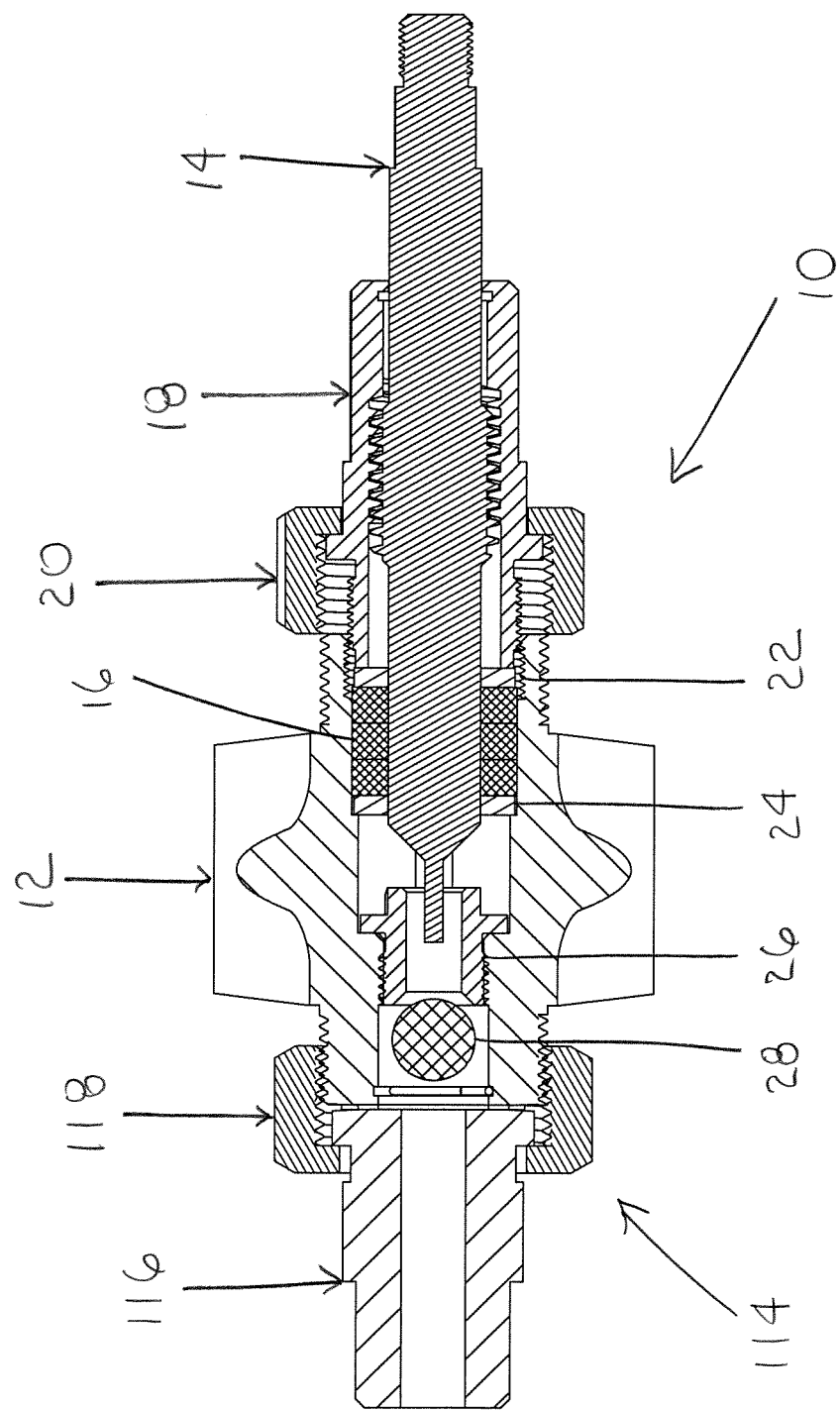
Figure 2A:
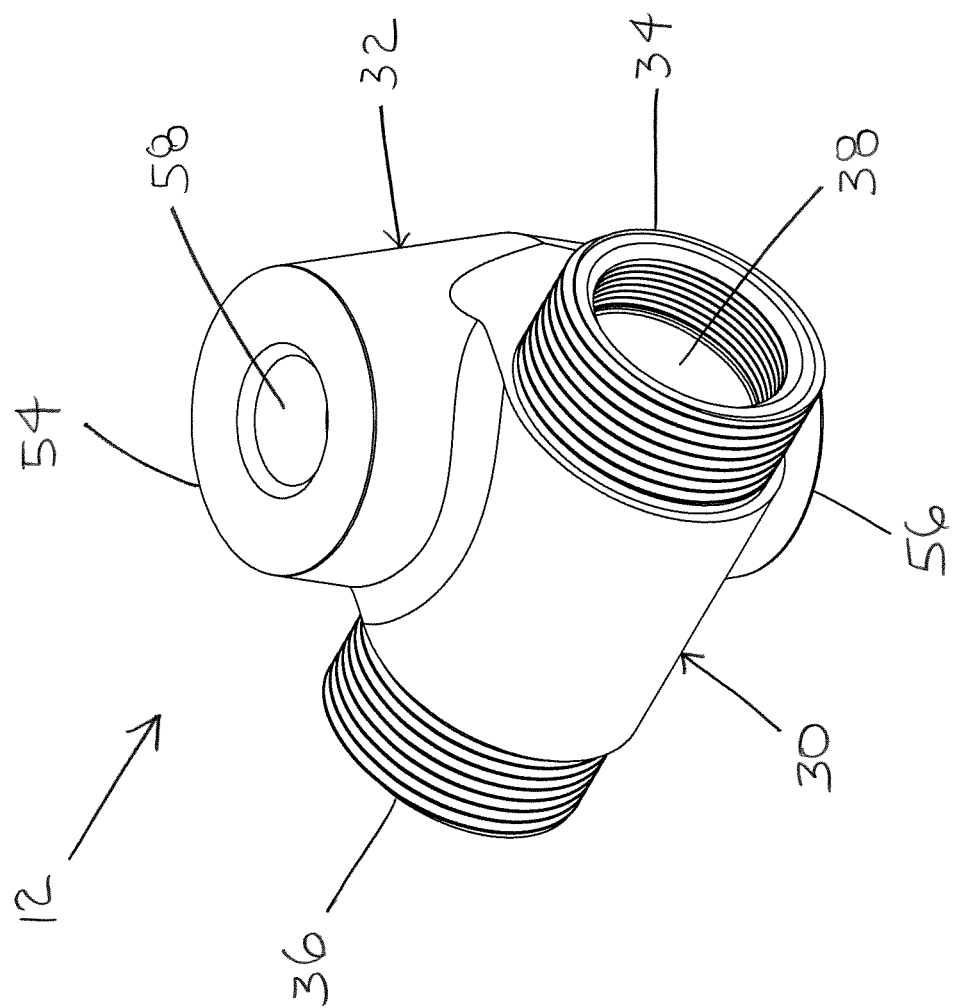
FIGS. 2a-2e are views of a body for use in the valve of FIG. 1 according to an exemplary embodiment of the present invention
Figure 2C:
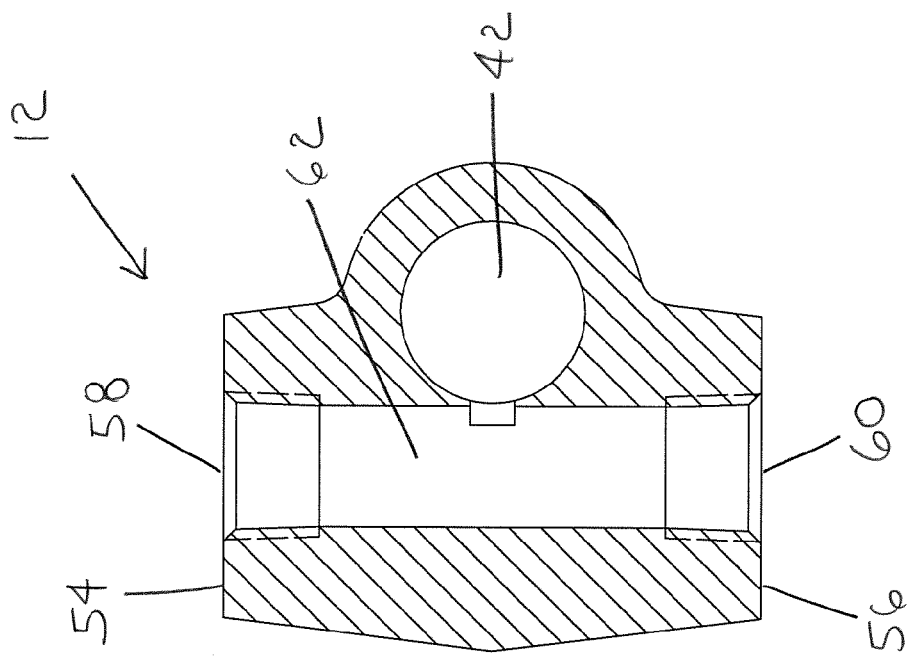
Figure 2B:
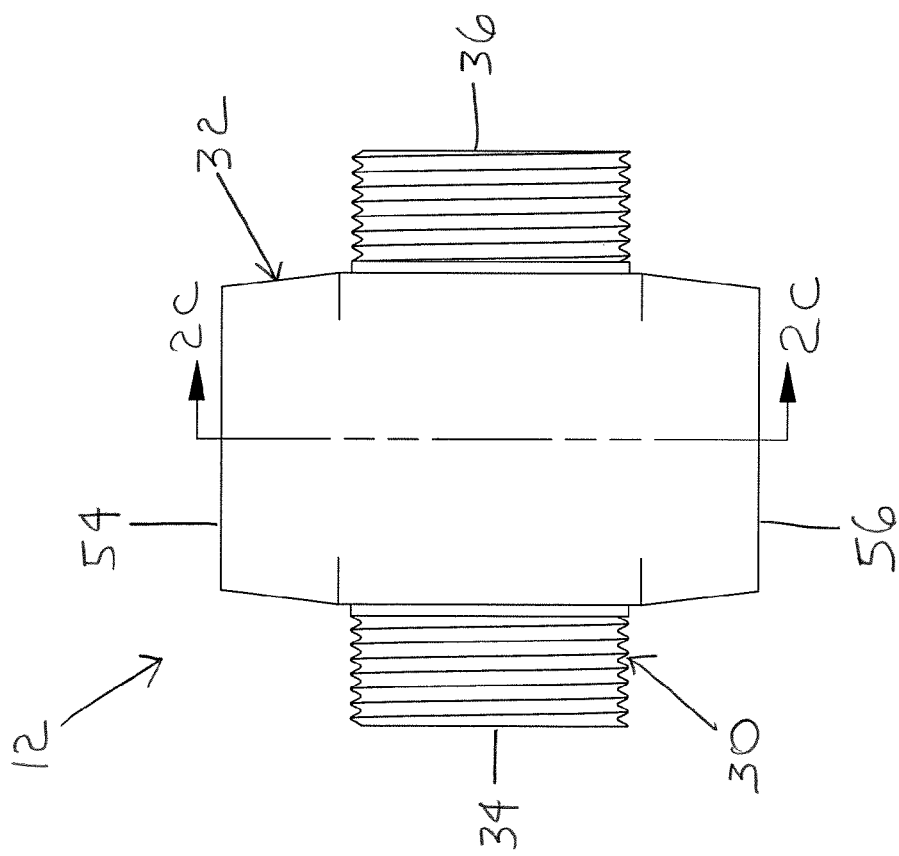
Figure 2D:
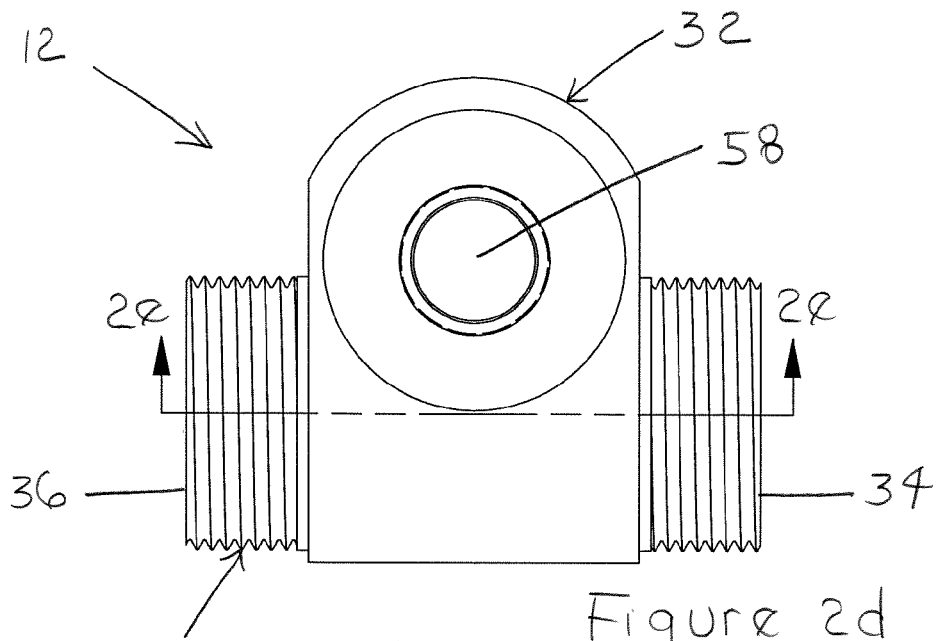
Figure 2E:
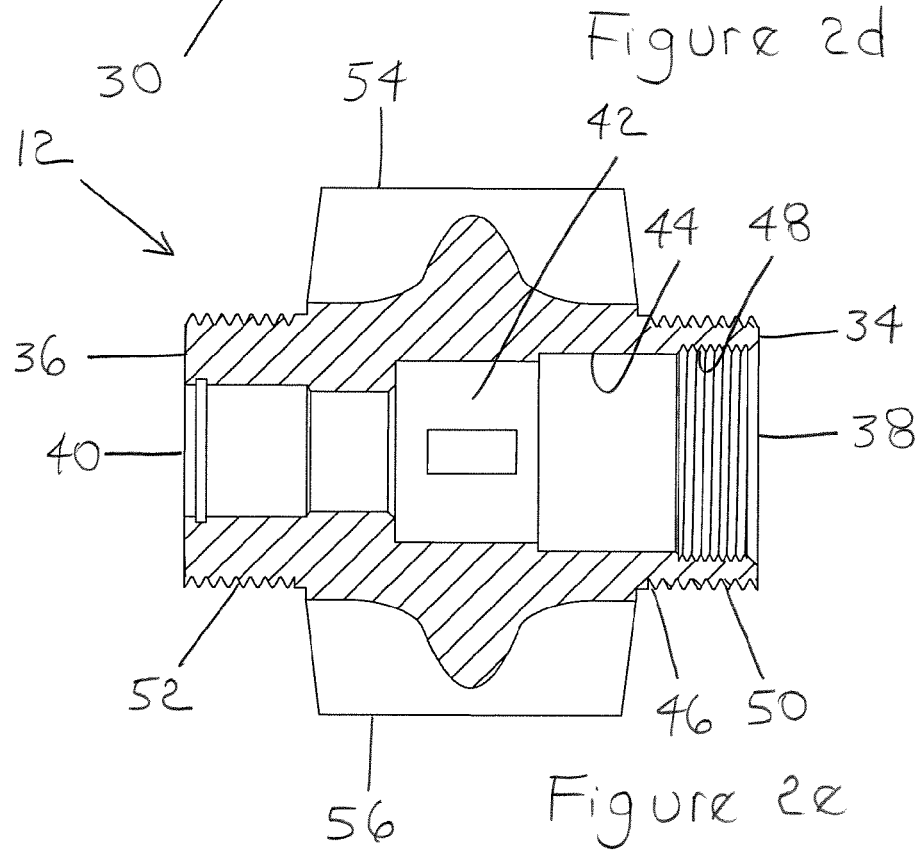

The present invention provides a valve with different threads for preventing rotation of and locking a bonnet with the valve. An exemplary embodiment of a valve 10 of the present invention is illustrated in FIGS. 1a-1c. In the exemplary embodiment, the valve 10 includes a body 12, a stem 14, a sealing member 16, a bonnet 18, a locking nut 20, a first washer 22, a second washer 24, a seat 26, and a ball 28.

An exemplary embodiment of the body 12 is shown in detail in FIGS. 2a-2e. The body includes a longitudinal portion 30 and a transverse portion 32. The longitudinal portion 30 includes a first end 34 and a second end 36. The first end 34 includes an opening 38. The second end 36 includes an opening 40. The longitudinal portion 30 includes a longitudinal bore 42 extending between the opening 38 in the first end 34 and the opening 40 in the second end 36. The longitudinal portion 30 has an inner surface 44 and an outer surface 46. At least a portion of the inner surface 44 of the longitudinal portion 30 at the first end 34 includes threads 48 having a first thread pitch and a first thread direction. At least a portion of the outer surface 46 of the longitudinal portion 30 at the first end 34 includes threads 50 having a second thread pitch and a second thread direction. At least a portion of the outer surface 46 of the longitudinal portion 30 at the second end 36 includes threads 52. The transverse portion 32 includes a top side 54 and a bottom side 56. The top side 54 includes an opening 58. The bottom side 56 includes an opening 60. The transverse portion 32 includes a transverse bore 62 extending between the opening 58 in the top side 54 and the opening 60 in the bottom side 56 transversely to the longitudinal bore 42. In an exemplary embodiment, the body 12 is made of carbon steel.

Figure 3A:
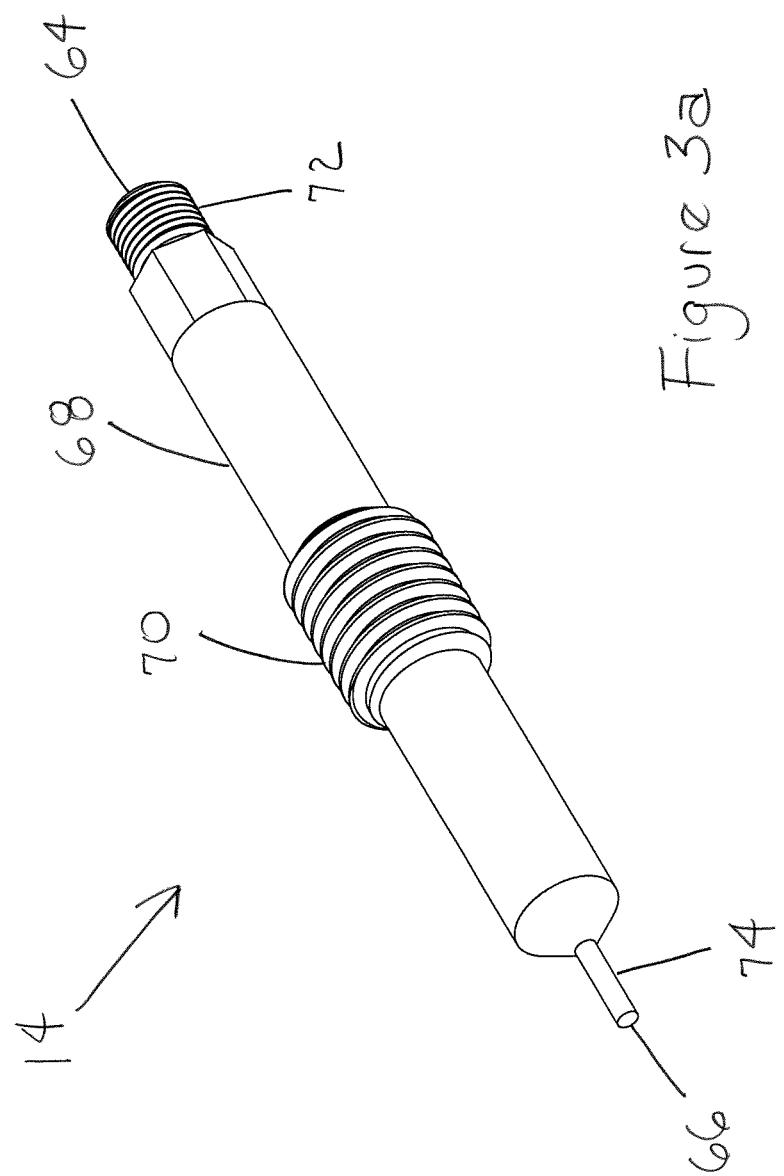

An exemplary embodiment of the stem 14 is shown in detail in FIGS. 3a-3c. The stem 14 includes a first end 64 and a second end 66. The stem 14 has an outer surface 68. At least a portion of the outer surface 68 of the stem 14 includes threads 70 having a third thread pitch and a third thread direction. The first end 64 of the stem 14 includes a connector 72. In an exemplary embodiment, the connector 72 is threaded. The second end 66 of the stem 14 includes a needle tip 74. In an exemplary embodiment, the stem 14 is made of stainless steel.

Figure 4A:
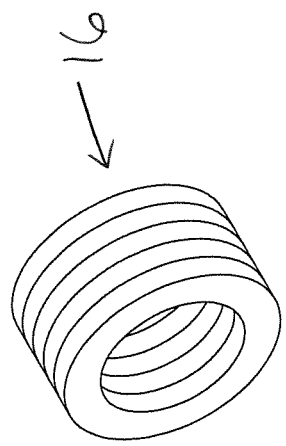
FIGS. 4a-4c are views of a sealing member for use in the valve of FIG. 1 according to an exemplary embodiment of the present invention
Figure 4C:
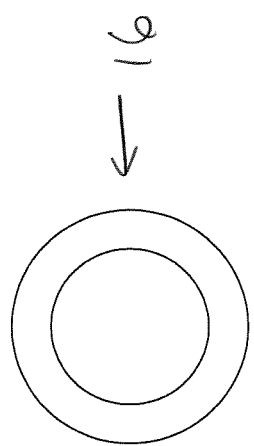
Figure 4B:
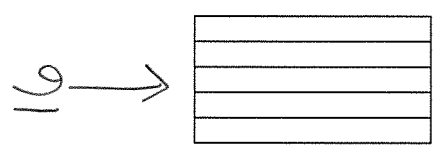
Figure 6A:
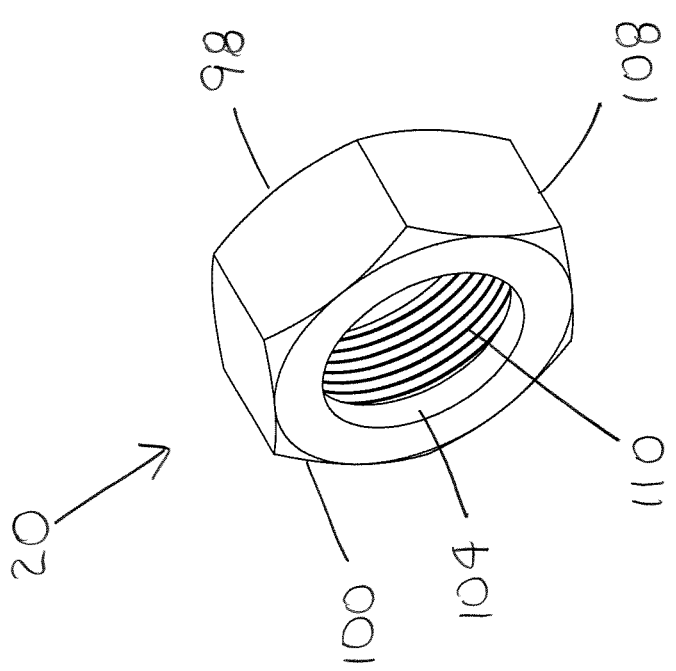
FIGS. 6a-6d are views of a locking nut for use in the valve of FIG. 1 according to an exemplary embodiment of the present invention
Figure 6D:
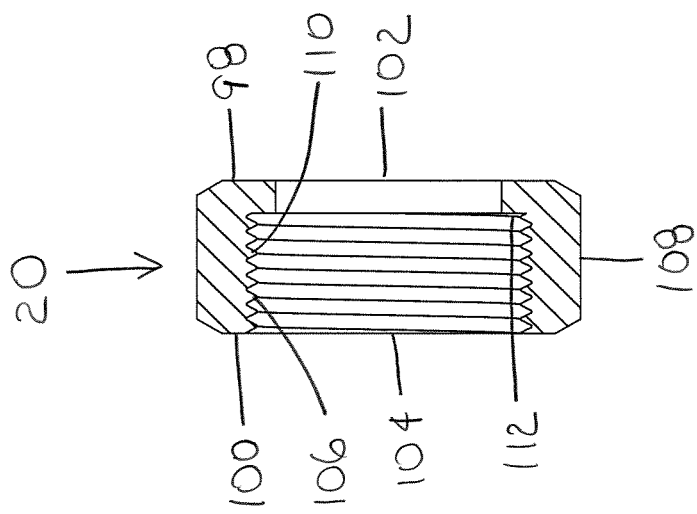
Figure 6C:
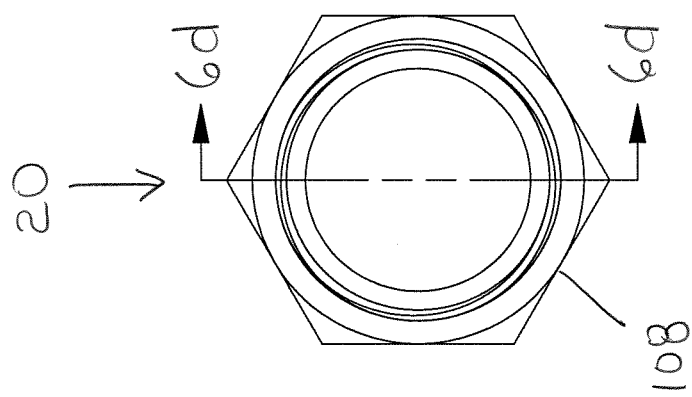
Figure 6B:
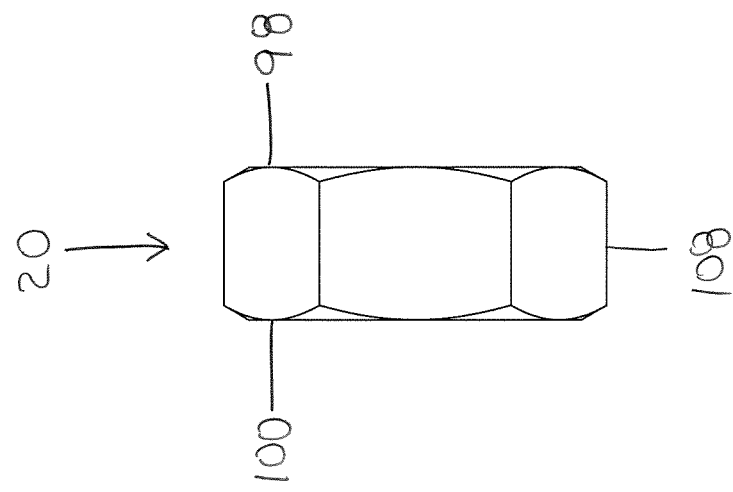

An exemplary embodiment of the sealing member 16 is shown in detail in FIGS. 4a-4c. In an exemplary embodiment, the sealing member 16 is made of graphite.

An exemplary embodiment of the bonnet 18 is shown in detail in FIGS. 5a-5c. The bonnet 18 includes a first end 76 and a second end 78. The first end 76 includes an opening 80. The second end 78 includes an opening 82. The bonnet 18 includes a longitudinal bore 84 extending between the opening 80 in the first end 76 and the opening 82 in the second end 78. The bonnet 18 has an inner surface 86 and an outer surface 88. At least a portion of the inner surface 88 of the bonnet 18 includes threads 90 having the third thread pitch and the third thread direction. At least a portion of the outer surface 88 of the bonnet 18 at the second end 78 includes threads 92 having the first thread pitch and the first thread direction. The bonnet 18 includes a flange 94 extending from the inner surface 86 thereof at the first end 76. The bonnet 18 includes a flange 96 extending from the outer surface 88 thereof. In an exemplary embodiment, at least a portion of the outer surface 88 of the bonnet 18 is non-circular, such as hexagonal. In an exemplary embodiment, the bonnet 18 is made of stainless steel.

An exemplary embodiment of the locking nut 20 is shown in detail in FIGS. 6a-6d. The locking nut 20 includes a first end 98 and a second end 100. The first end 98 includes an opening 102. The second end 100 includes an opening 104. The locking nut 20 has an inner surface 106 and an outer surface 108. At least a portion of the inner surface 106 of the locking nut 20 includes threads 110 having the second thread pitch and the second thread direction. The locking nut 20 includes a flange 112 extending from the inner surface 106 thereof at the first end 98. In an exemplary embodiment, the locking nut 20 is made of carbon steel.

In an exemplary embodiment, the first thread pitch is different than the second thread pitch.

In an exemplary embodiment, the first thread direction is different than the second thread direction.

In an exemplary embodiment, the first thread pitch is finer than the second thread pitch. In an alternative embodiment, the first thread pitch is coarser than the second thread pitch.

In an exemplary embodiment, the first thread direction is a left hand direction, and the second thread direction is a right hand direction. In an alternative embodiment, the first thread direction is a right hand direction, and the second thread direction is a left hand direction.

In an exemplary embodiment, the third thread pitch is different than the first thread pitch. In an alternative embodiment, the third thread pitch is the same as the first thread pitch.

In an exemplary embodiment, the third thread direction is different than the first thread direction. In an alternative embodiment, the third thread direction is the same as the first thread direction In an exemplary embodiment, the third thread pitch is different than the second thread pitch. In an alternative embodiment, the third thread pitch is the same as the second thread pitch.

In an exemplary embodiment, the third thread direction is different than the second thread direction. In an alternative embodiment, the third thread direction is the same as the second thread direction In an exemplary embodiment, the longitudinal bore 42 in the body 12 is operable to receive at least a portion of the stem 14. The stem 14 is operable to interact with the seat 26 and the ball 28 and open and close the valve 10. The second end 78 of the bonnet 18 is operable to be threaded into the first end 34 of the longitudinal portion 30 of the body 12. The sealing member 16 is operable to form a seal between the stem 14 and the body 12 internal to the threads 70 on the stem 14 and the threads 90 on the bonnet 18 when the stem 14 is inserted into the longitudinal bore 42 in the body 12 and the second end 78 of the bonnet 18 is threaded into the first end 34 of the body 12. The locking nut 20 is operable to be threaded onto the outer surface 46 of the first end 34 of the body 12. The flange 112 extending from the inner surface 106 of the locking nut 20 is operable to interface with the flange 96 extending from the outer surface 88 of the bonnet 18 and prevent the bonnet 18 from being threaded out of the first end 34 of the body 12.

To assemble the valve 10, the ball 28, the seat 26, the second washer 24, the sealing member 16, and the first washer 22 are inserted into the longitudinal bore 42 through the first end 34 of the body 12. The first end 64 of the stem 14 is inserted into the second end 78 of the bonnet 18. The stem 14 is threaded into the bonnet 18. The second end 66 of the stem 14 (with the bonnet 18 assembled to the stem 14) is inserted into the first end 34 of the body 12 and through the first washer 22, the sealing member 16, the second washer 24, and the seat 26. As the second end 66 of the stem 14 is inserted into the first end 34 of the body 12, the second end 78 of the bonnet 18 is threaded into the first end 34 of the body 12. The locking nut 20 is placed over the first end 64 of the stem 14 and the first end 76 of the bonnet 18. The locking nut 20 is threaded onto the first end 34 of the body 12. A handle (not shown) is attached to the connector 72 on the first end 64 of the stem 14.

Once assembled, rotation of the stem 14 within the bonnet 18 does not cause rotation of the bonnet 18 within the body 12. The difference in: (1) the thread pitch between the first thread pitch and the second thread pitch, and/or (2) the thread direction between the first thread direction and the second thread direction, prevents rotation of the bonnet 18 within the body 12. As a result, the bonnet 18 is locked within the body 12.

The assembled valve 10 can be installed in a process. In an exemplary embodiment, the assembled valve 10 is connected to a vessel, such as a drum or tank, at the second end 36 of the longitudinal portion 30 of the body 12 of the valve 10. Additionally, in an exemplary embodiment, the assembled valve 10 is connected to a gage, such as a liquid level gage, at the top side 54 and/or the bottom side 56 of the transverse portion 32 of the body 12 of the valve 10.

Figure 7A:
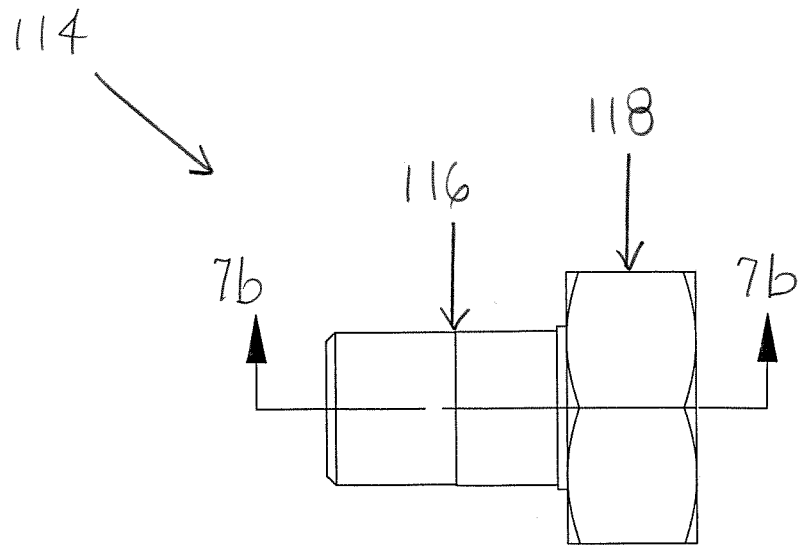
FIGS. 7a-7b are views of a vessel connection for use in the valve of FIG. 1 according to an exemplary embodiment of the present invention
Figure 7B:
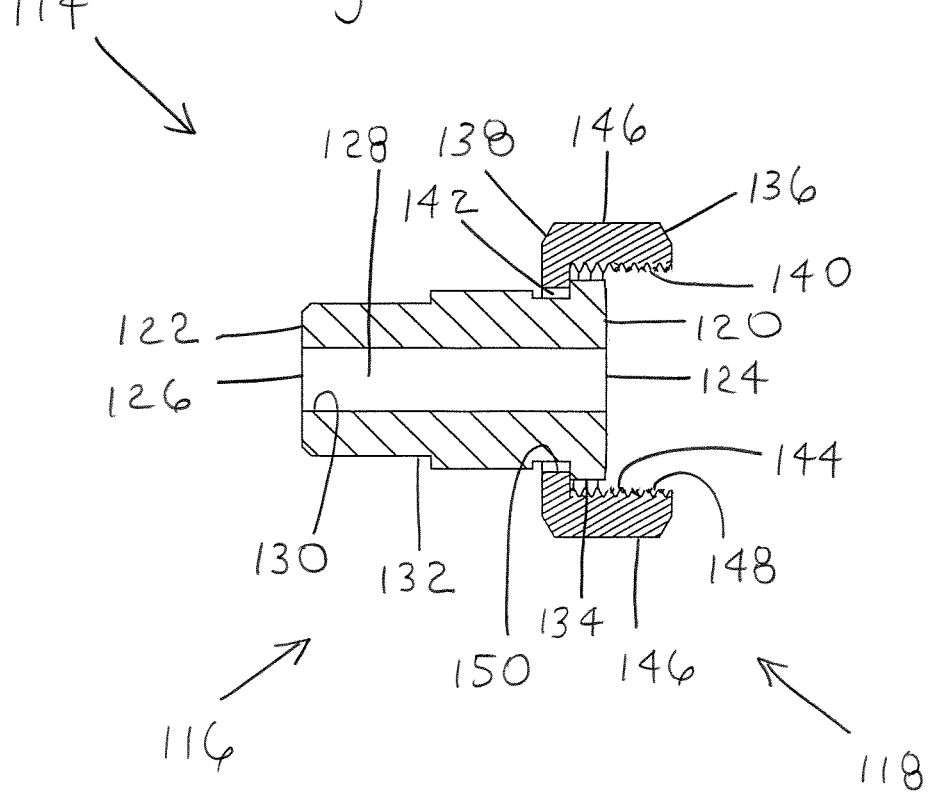

An exemplary embodiment of a vessel connection 114 for use in connecting the valve 10 to a vessel is shown in detail in FIGS. 7a-7b. In an exemplary embodiment, the vessel connection 114 is a union connection. The vessel connection 114 includes a connector body 116 and a vessel nut 118.

An exemplary embodiment of the connector body 116 is shown in detail in FIGS. 7a-7b. The connector body 116 includes a first end 120 and a second end 122. The first end 120 includes an opening 124. The second end 122 includes an opening 126. The connector body 116 includes a longitudinal bore 128 extending between the opening 124 in the first end 120 and the opening 126 in the second end 122. The connector body 116 has an inner surface 130 and an outer surface 132. The connector body 116 includes a flange 134 extending from the outer surface 132 thereof at the first end 120.

An exemplary embodiment of the vessel nut 118 is shown in detail in FIGS. 7a-7b. The vessel nut 118 includes a first end 136 and a second end 138. The first end 136 includes an opening 140. The second end 138 includes an opening 142. The vessel nut 118 has an inner surface 144 and an outer surface 146. At least a portion of the inner surface 144 of the first end 136 of the vessel nut 118 includes threads 148. The vessel nut 118 includes a flange 150 extending from the inner surface 144 thereof at the second end 138.

In an exemplary embodiment, the second end 36 of the longitudinal portion 30 of the body 12 of the valve 10 is operable to abut the first end 120 of the connector body 116. The longitudinal bore 42 in the body 12 of the valve 10 is operable to generally align with the longitudinal bore 128 in the connector body 116. The flange 134 on the first end 120 of the connector body 116 is operable to interface with the flange 150 on the second end 138 of the vessel nut 118. The second end 36 of the longitudinal portion 30 of the body 12 of the valve 10 is operable to be threaded into the first end 136 of the vessel nut 118.

To connect the valve 10 to the vessel connection 114, the second end 36 of the longitudinal portion 30 of the body 12 of the valve 10 is threaded into the first end 136 of the vessel nut 118. As a result, the second end 36 of the longitudinal portion 30 of the body 12 of the valve 10 is placed in abutting contact with the first end 120 of the connector body 116, and the longitudinal bore 42 in the body 12 of the valve 10 is generally aligned with the longitudinal bore 128 in the connector body 116.

To disconnect the valve 10 from the vessel connection 114, the second end 36 of the longitudinal portion 30 of the body 12 of the valve 10 is threaded out of the first end 136 of the vessel nut 118. As a result, the second end 36 of the longitudinal portion 30 of the body 12 of the valve 10 is removed from contact with the first end 120 of the connector body 116.

One of ordinary skill in the art will now appreciate that the present invention provides a valve with different threads for preventing rotation of and locking a bonnet with the valve. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A valve, comprising:
a body, the body including a longitudinal portion and a transverse portion, the longitudinal portion of the body including a first end and a second end, the first end including an opening, the second end including an opening, the longitudinal portion of the body including a longitudinal bore extending between the opening in the first end and the opening in the second end, at least a portion of the longitudinal bore in the body being operable to have liquid flow through it, the longitudinal portion of the body having an inner surface and an outer surface, the opening in the first end extending through the outer surface of the longitudinal portion of the body, the opening in the second end extending through the outer surface of the longitudinal portion of the body, at least a portion of the inner surface of the longitudinal portion of the body at the first end including threads having a first thread pitch and a first thread direction, at least a portion of the outer surface of the longitudinal portion of the body at the first end including threads having a second thread pitch and a second thread direction, the transverse portion of the body including a top side and a bottom side, the top side including an opening, the bottom side including an opening, the transverse portion of the body including a transverse bore extending between the opening in the top side and the opening in the bottom side transversely to the longitudinal bore, at least a portion of the transverse bore in the body being operable to have liquid flow through it, the longitudinal portion and the transverse portion of the body being monolithically formed;
a stem, the stem having a first end and a second end, the stem having an outer surface, at least a portion of the outer surface of the stem including threads having a third thread pitch and a third thread direction;
a sealing member;
a bonnet, the bonnet including a first end and a second end, the first end including an opening, the second end including an opening, the bonnet including a longitudinal bore extending between the opening in the first end and the opening in the second end, the bonnet having an inner surface and an outer surface, at least a portion of the inner surface of the bonnet including threads having the third thread pitch and the third thread direction, at least a portion of the outer surface of the bonnet at the second end including threads having the first thread pitch and the first thread direction; and
a locking nut, the locking nut including a first end and a second end, the first end including an opening, the second end including an opening, the locking nut having an inner surface and an outer surface, at least a portion of the inner surface of the locking nut including threads having the second thread pitch and the second thread direction;
wherein, at least one of: (1) the first thread pitch is different than the second thread pitch, and (2) the first thread direction is different than the second thread direction;
wherein the longitudinal bore in the body is operable to receive at least a portion of the stem;
wherein the second end of the bonnet is operable to be threaded into the first end of the body;
wherein the sealing member is operable to form a seal between the stem and the body when the stem is inserted into the longitudinal bore in the body and the second end of the bonnet is threaded into the first end of the body; and
wherein the locking nut is operable to be threaded onto the outer surface of the first end of the body;
whereby rotation of the stem within the bonnet does not cause rotation of the bonnet within the body.

2. The valve of claim 1, wherein the first thread pitch is different than the second thread pitch.

3. The valve of claim 2, wherein the first thread pitch is finer than the second thread pitch.

4. The valve of claim 1, wherein the first thread direction is different than the second thread direction.

5. The valve of claim 4, wherein the first thread direction is a left hand direction, and the second thread direction is a right hand direction.

6. The valve of claim 1, wherein, at least one of: (1) the third thread pitch is different than the first thread pitch, and (2) the third thread direction is different than the first thread direction.

7. The valve of claim 1, wherein, at least one of: (1) the third thread pitch is different than the second thread pitch, and (2) the third thread direction is different than the second thread direction.

8. A valve, comprising:
a body, the body including a longitudinal portion and a transverse portion, the longitudinal portion of the body including a first end and a second end, the first end including an opening, the second end including an opening, the longitudinal portion of the body including a longitudinal bore extending between the opening in the first end and the opening in the second end, at least a portion of the longitudinal bore in the body being operable to have liquid flow through it, the longitudinal portion of the body having an inner surface and an outer surface, the opening in the first end extending through the outer surface of the longitudinal portion of the body, the opening in the second end extending through the outer surface of the longitudinal portion of the body, at least a portion of the inner surface of the longitudinal portion of the body at the first end including threads having a first thread pitch and a first thread direction, at least a portion of the outer surface of the longitudinal portion of the body at the first end including threads having a second thread pitch and a second thread direction, the transverse portion of the body including a top side and a bottom side, the top side including an opening, the bottom side including an opening, the transverse portion of the body including a transverse bore extending between the opening in the top side and the opening in the bottom side transversely to the longitudinal bore, at least a portion of the transverse bore in the body being operable to have liquid flow through it, the longitudinal portion and the transverse portion of the body being monolithically formed;
a stem, the stem having a first end and a second end, the stem having an outer surface, at least a portion of the outer surface of the stem including threads having a third thread pitch and a third thread direction;
a sealing member;
a bonnet, the bonnet including a first end and a second end, the first end including an opening, the second end including an opening, the bonnet including a longitudinal bore extending between the opening in the first end and the opening in the second end, no portion of the longitudinal bore in the bonnet being operable to have liquid flow through it, the bonnet having an inner surface and an outer surface, at least a portion of the inner surface of the bonnet including threads having the third thread pitch and the third thread direction, at least a portion of the outer surface of the bonnet at the second end including threads having the first thread pitch and the first thread direction; and
a locking nut, the locking nut including a first end and a second end, the first end including an opening, the second end including an opening, the locking nut having an inner surface and an outer surface, at least a portion of the inner surface of the locking nut including threads having the second thread pitch and the second thread direction;
wherein, at least one of: (1) the first thread pitch is different than the second thread pitch, and (2) the first thread direction is different than the second thread direction;
wherein the longitudinal bore in the body is operable to receive at least a portion of the stem;
wherein the second end of the bonnet is operable to be threaded into the first end of the body and to compress the sealing member in the longitudinal bore in the body;
wherein the sealing member is operable to form a seal between the stem and the body when the stem is inserted into the longitudinal bore in the body and the second end of the bonnet is threaded into the first end of the body; and
wherein the locking nut is operable to be threaded onto the outer surface of the first end of the body;
whereby rotation of the stem within the bonnet does not cause rotation of the bonnet within the body.

9. The valve of claim 8, wherein the first thread pitch is different than the second thread pitch.

10. The valve of claim 9, wherein the first thread pitch is finer than the second thread pitch.

11. The valve of claim 8, wherein the first thread direction is different than the second thread direction.

12. The valve of claim 11, wherein the first thread direction is a left hand direction, and the second thread direction is a right hand direction.

13. The valve of claim 8, wherein, at least one of: (1) the third thread pitch is different than the first thread pitch, and (2) the third thread direction is different than the first thread direction.

14. The valve of claim 8, wherein, at least one of: (1) the third thread pitch is different than the second thread pitch, and (2) the third thread direction is different than the second thread direction.

15. A valve, comprising:
a body, the body including a longitudinal portion and a transverse portion, the longitudinal portion of the body including a first end and a second end, the first end including an opening, the second end including an opening, the longitudinal portion of the body including a longitudinal bore extending between the opening in the first end and the opening in the second end, at least a portion of the longitudinal bore in the body being operable to have liquid flow through it, the longitudinal portion of the body having an inner surface and an outer surface, the opening in the first end extending through the outer surface of the longitudinal portion of the body, the opening in the second end extending through the outer surface of the longitudinal portion of the body, at least a portion of the inner surface of the longitudinal portion of the body at the first end including threads having a first thread pitch and a first thread direction, at least a portion of the outer surface of the longitudinal portion of the body at the first end including threads having a second thread pitch and a second thread direction, the transverse portion of the body including a top side and a bottom side, the top side including an opening, the bottom side including an opening, the transverse portion of the body including a transverse bore extending between the opening in the top side and the opening in the bottom side transversely to the longitudinal bore, at least a portion of the transverse bore in the body being operable to have liquid flow through it, the longitudinal portion and the transverse portion of the body being monolithically formed;
a stem, the stem having a first end and a second end, the stem having an outer surface, at least a portion of the outer surface of the stem including threads having a third thread pitch and a third thread direction;
a sealing member;
a bonnet, the bonnet including a first end and a second end, the first end including an opening, the second end including an opening, the bonnet including a longitudinal bore extending between the opening in the first end and the opening in the second end, the bonnet having an inner surface and an outer surface, at least a portion of the inner surface of the bonnet including threads having the third thread pitch and the third thread direction, at least a portion of the outer surface of the bonnet at the second end including threads having the first thread pitch and the first thread direction; and
a locking nut, the locking nut including a first end and a second end, the first end including an opening, the second end including an opening, the locking nut having an inner surface and an outer surface, at least a portion of the inner surface of the locking nut including threads having the second thread pitch and the second thread direction;

wherein, at least one of: (1) the first thread pitch is different than the second thread pitch, and (2) the first thread direction is different than the second thread direction;

wherein, at least one of: (1) the third thread pitch is different than the first thread pitch, and (2) the third thread direction is different than the first thread direction;

wherein the longitudinal bore in the body is operable to receive at least a portion of the stem;

wherein the second end of the bonnet is operable to be threaded into the first end of the body;

wherein the sealing member is operable to form a seal between the stem and the body when the stem is inserted into the longitudinal bore in the body and the second end of the bonnet is threaded into the first end of the body; and wherein the locking nut is operable to be threaded onto the outer surface of the first end of the body;

whereby rotation of the stem within the bonnet does not cause rotation of the bonnet within the body.

16. The valve of claim 15, wherein the first thread pitch is different than the second thread pitch.

17. The valve of claim 16, wherein the first thread pitch is finer than the second thread pitch.

18. The valve of claim 15, wherein the first thread direction is different than the second thread direction.

19. The valve of claim 18, wherein the first thread direction is a left hand direction, and the second thread direction is a right hand direction.

20. The valve of claim 15, wherein, at least one of: (1) the third thread pitch is different than the second thread pitch, and (2) when the first thread direction is the same as the second thread direction or the third thread direction, the third thread direction is different than the second thread direction.

* * * * *